J. HARRIS.
ELECTROLYTIC CELL.
APPLICATION FILED AUG. 4, 1919.
1,420,037.
Patented June 20, 1922.
2 SHEETS—SHEET 2.
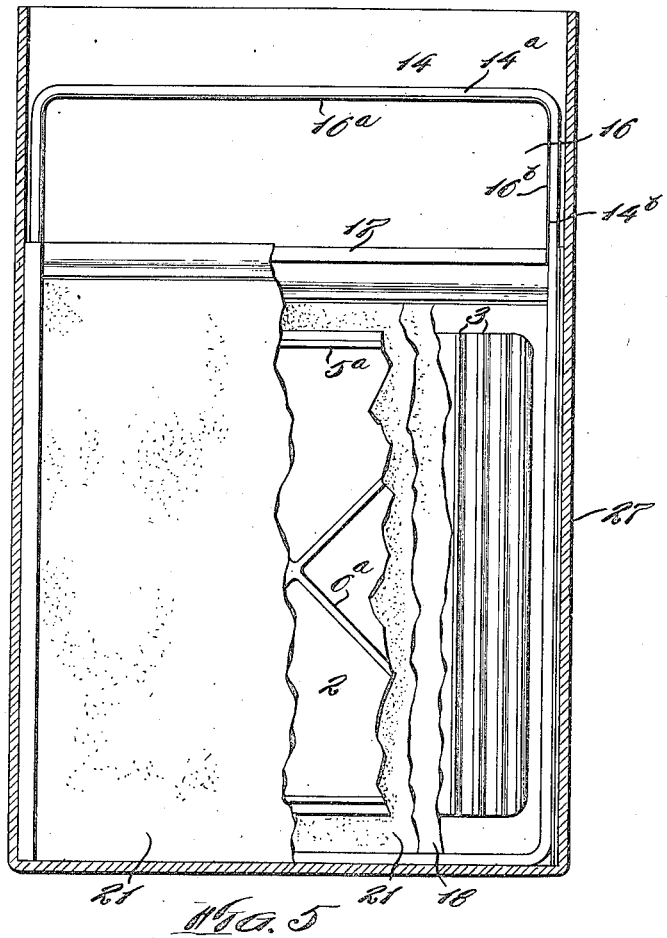
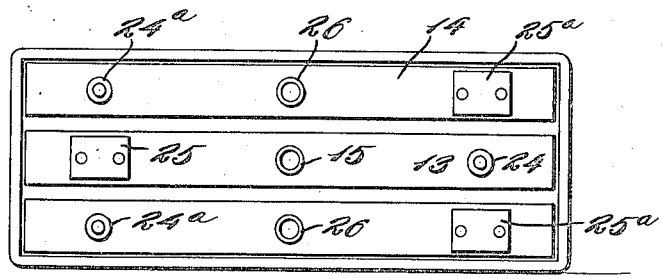

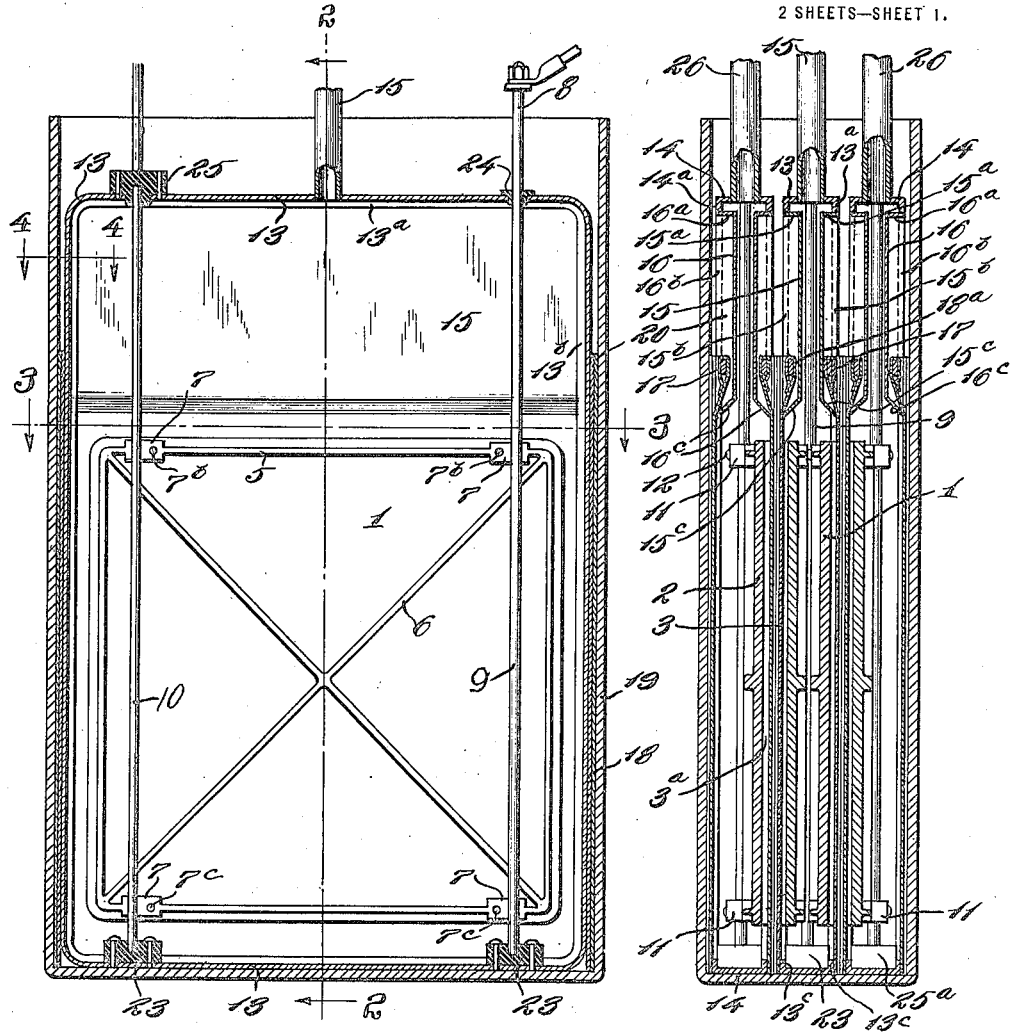

UNITED STATES PATENT OFFICE.

JOHN HARRIS, OF LAKEWOOD, OHIO, ASSIGNOR TO CARBO-OXYGEN COMPANY, OF PITTSBURGH, PENNSYLVANIA, A CORPORATION OF DELAWARE.

ELECTROLYTIC CELL.

1,420,037.  Specification of Letters Patent.  Patented June 20, 1922.

Application filed August 4, 1919. Serial No. 315,117.

*To all whom it may concern:*

Be it known that I, JOHN HARRIS, a citizen of the United States, residing at Lakewood, in the county of Cuyahoga and State of Ohio, have invented a certain new and useful Improvement in Electrolytic Cells, of which the following is a full, clear, and exact description, reference being had to the accompanying drawings.

This invention relates to electrolytic cells such as are used for the generation of hydrogen and oxygen. The general object of the invention is to provide a cell or apparatus of this character which is extremely efficient in operation, which will prevent the mixing of the hydrogen and oxygen; and which will have a maximum capacity and output for the dimensions of the plates or electrodes employed therein. Further and more limited objects of the invention will be realized in and through the construction and arrangement of the parts described in the specification and embodied in the claims appended hereto.

In the drawings, Fig. 1 represents a central vertical sectional view through a cell constructed in accordance with my invention; Figs. 2, 3, and 4 sectional details corresponding respectively to the lines 2—2, 3—3 and 4—4 of Fig. 1; Fig. 5 is a view similar to Fig. 1 taken through the tank or receptacle immediately within one of the walls thereof, the plates and diaphragms being broken away; and Fig. 6 a plan view of a complete cell.

Each cell shown herein comprises a unit consisting of a pair of centrally arranged anode plates, cathode plates arranged on opposite sides of the anode plates, and diaphragms extending across the said plates, the diaphragms being spaced apart to provide a means for the escape to the atmosphere of any stray gases while separating the oxygen and the hydogen and conducting such gases to their respective outlets, with a special construction and arrangement of parts for supporting and supplying current to the plates and for collecting the liberated gases. The cell thus constructed is placed within a suitable tank, and as many of these cells or units may be employed as desirable, according to the capacity of the apparatus, the cell or unit herein illustrated being arranged for connection in series with a like cell or unit. In the drawings, a single cell is shown, the connections of the elements thereof to corresponding elements of an adjacent cell being obvious.

Describing the parts by reference characters, 1 denotes a pair of anodes and 2 the corresponding cathodes. The anodes and cathodes are preferably of galvanized cast iron and square in outline. They are substantially identical in construction; hence a detailed description of an anode will suffice for both elements. The front or generating surface of each anode is provided with a plurality of vertical ribs 3, each rib being V-shaped in section, the sides of the V meeting in a line, for a purpose to be explained hereinafter. In actual practice, I have made the plates 1 and 2 about twenty-seven inches square, with the ribs about one inch apart, the ribs projecting about one-eighth inch from the front face 4 of each plate and the body of the plate being about one-fourth inch thick. On its rear face, each plate (anode and cathode) is provided with a rib 5 extending therearound a short distance within the margin or periphery thereof and with diagonal ribs 6 intersecting each other and the rib 5 at the corners thereof. Near each side thereof, the top and bottom branches or portions of the rib 5 are provided with bosses 7, each boss having a concave recess 8 for the reception of the conducting and supporting rods, indicated respectively at 9 and 10.

Each of the cathodes 2 is constructed in the same manner as the anodes 1 except that the ribs $3^a$ are staggered with respect to the ribs 3, being arranged, when assembled, midway between the ribs on their corresponding anode. The back of each cathode will be provided with ribs $5^a$ and $6^a$ corresponding respectively to the ribs 5 and 6 of the anodes. Each cathode will be provided at its back with bosses $7^a$ similar to bosses 7, each having a concaved recess $8^a$ similar to the recesses 8. In order to secure the cathodes to their conducting and supporting rods, indicated respectively at $9^a$ and $10^a$, each lug is provided with a clamping member 11 having a concave recess cooperating with the concave recess in the said lug and secured to said lug as by means of a screw bolt 12. The anodes are connected together and to their conducting and supporting rods by means of screws $7^b$ mounted in apertures $7^c$ in the bosses 7.

When the anodes and cathodes are assembled, the two anodes and each cathode will be mounted within rectangular frames each having a gas collecting chamber in the top thereof, each frame being formed of a channeled strip of sheet metal having the flanges presented inwardly. The frame for the anodes is indicated at 13 and the two frames for the cathodes at 14. When the parts are assembled, the bottoms of the frames 13 and 14 extend below the bottoms of the plates 1 and 2 and the tops of the frames extend considerably above the tops of the plates to provide, with the cooperating side plates, collecting chambers for gases each having a seal of electrolyte extending preferably about a foot above the tops of the plates. To provide such a chamber for the oxygen, I secure to the top flanges $13^a$ and side flanges $13^b$ of the frame 13 sheet metal plates comprising each an inwardly directed body or web 15, a top flange $15^a$ and side flanges $15^b$, welding the flanges $15^a$ to the flanges $13^a$ and the flanges $15^b$ to the flanges $13^b$. A short distance above the tops of the anode plates, the bottoms of the webs 15 are bent outwardly, as shown at $15^c$, the flanges $15^b$ being broken away to permit the ends of the outwardly deflected parts $15^c$ to extend across the flanges $13^b$ as far as the outer edges thereof and to be welded thereto. There is thus provided above the anode plates a collecting chamber formed by the sides and top of the frame 13 and by the inset plates 15. From the central portion of the top of the frame 13 there extends a pipe 15 for conducting oxygen to a suitable collector.

Each of the frames 14 is constructed in substantially the same manner as the frame 13, and a collecting receptacle is provided within the upper portion of each of the frames 14 in the same manner as is the case with the frame 13. 16 denotes the web or body of one of the inset plates applied to each side of the frame 14, $16^a$ the top flange and $16^b$ the side flange of each plate whereby it is welded to the flanges $14^a$ and $14^b$ of the frame 14, and $16^c$ the lower deflected end of each plate 16. In the assembly shown in the drawings, the lower ends of the inner plates $16^c$ are opposed to the lower ends $15^c$ of the plates 15, being spaced from the latter about one-eighth inch—the distance between the ribs 3 and $3^a$.

Extending across the space between the flanges $15^b$ and $16^b$ are straps 17, the ends of these straps being welded to the flanges $15^b$ and $16^b$. These straps serve as a securing means for the upper ends of the diaphragms.

It will be observed that the outer ends of the ribs 3 are in the planes of the outer edges of the channel flanges of the frame 13; also that the outer ends of the ribs $3^a$ are each in the plane of one of the channel flanges of the frames 14. Cooperating with the anode plates are the diaphragms 18, said diaphragms being preferably of asbestos cloth. The diaphragms 18 may be conveniently made from a single piece of cloth formed into a bag whereby it may be fitted tightly around the frame 13 and be drawn into close engagement with the ribs 3, being secured to the frame 13 by means of a pair of channel clamps 20. The upper end of the bag may be slotted and each side $18^a$ thereof may be drawn about the corresponding bars 17 and fastened thereto, as by stitching. The diaphragms will contact closely with the bottoms of the out-deflected portions $15^c$ of the plates 15, a close and leak-proof contact being assured by spacing the bars 17 so that the diaphragms will be bent above such bottoms inwardly, or toward the webs 15.

Similar diaphragms 21 will be applied in like manner to the cathode plates and to their frames 14, the upper ends of the diaphragms being drawn around the outer bars 17 and secured thereto and the bodies of the diaphragms being secured to the said frames by means of channel clamps 22 similar to the clamps 20.

The bottom web of each of the frames 13 has secured thereto a pair of insulating bosses 23, said bosses being adapted to receive the rods 8 and 9 respectively. In the top web of the frame 13 there is an insulating bushing 24 through which the conducting rod 8 extends; and to the other side of said web there is secured a block of insulating material 25 which receives the upper end of the supporting or steadying rod 9. Similar insulating blocks $25^a$ are secured to the bottom webs of the frames 14 while the top web of each said frame is provided with a bushing $24^a$ and an insulating block $25^a$ similar to the parts 24 and 25 but arranged at opposite ends of the frame. From the central portion of the top of each frame 14 there extends a pipe connection 26 for conducting hydrogen to a suitable receptacle.

The parts above described are inserted as a unit within a suitable receptacle 27, the said receptacle being of such length and width as to enable the assembly to fit snugly therewithin.

With the parts constructed and arranged as described, the receptacle 27 will be filled with electrolyte to a point a short distance below the tubes 15 and 26. This electrolyte will stand at the same level within the collecting chambers formed by the tops of the frames and the walls or plates 15 and 16, above the anodes and cathodes respectively. Current being supplied to the conductor 9 will decompose the electrolyte in the usual manner. The oxygen generated from the outer faces of the anodes 1 will ascend within the spaces provided by the diaphragms and the ribs 3, will strike the lower deflected ends 15ᶜ of the plates or walls 15, will pass upwardly into the collecting chamber formed by the frame 13 and said plates or walls and will be delivered through the pipe 15 to a suitable collector.

Hydrogen liberated at the inner faces of the cathode plates will ascend in the spaces provided between the diaphragms 21 and the ribs 3ᵃ, will strike the inwardly deflected ends 16ᶜ of the plates or walls 16, will enter the collecting chambers formed by the plates or walls 16 and the frames 14, and will be conducted through the pipes 26 to a suitable collector. Because of the fact that the contact between each diaphragm and each rib is a line contact, there will be no surface for the formation of a film of liquid at this point, and hence there will be no loss of gas, the diaphragms, as explained hereinbefore, being drawn tightly across said ribs and engaging tightly the lower deflected ends of the side walls of the plates of the collecting chambers. The level of electrolyte in the variously collecting chambers of each unit will be the same, since the collecting chambers are of the same transverse area and there will be twice as much hydrogen generated as oxygen. Should the cell, for any reason, fail to function properly, and some gas escape around the lower edges of the deflectors 15ᶜ and 16ᶜ or through the diaphragms such gas must escape to the atmosphere and cannot mingle with the other gas in its collecting chamber or delivering pipe. Even should the pressure of gas in one of the receiving tanks be sufficient to depress the electrolyte in its collecting chamber there will be no mingling of the gas with the other generated gas. In that case, should the pressure of the gas be sufficient to force it through its diaphragm, it would escape directly to the atmosphere through the space between said diaphragm and the diaphragm adjacent thereto.

The channel clamps 20 are advantageous, not only as a means for securing the diaphragms in place, but as a means for accurately positioning and spacing the anodes and cathodes and the diaphragms therefor. The cell is readily adaptable for such variations in voltage and amperage as exist in commercial electrical installations, and the cells or units may be connected in parallel as well as in series.

Having thus described my invention, what I claim is:

1. In an electrolytic cell, the combination of a pair of electrode plates arranged back to back and each having in its outer face a plurality of vertical V-shaped ribs, a collecting chamber above said plates, said chamber having the bottoms of its side walls deflected downwardly and outwardly with the lower ends thereof in the planes of the said ribs of said plates respectively, a diaphragm extending across the ribs of each of said plates and across the lower edges of the corresponding chamber walls, an electrode plate cooperating with each of the first mentioned plates and each having ribs in a face thereof presented toward such first mentioned plates, a collecting chamber for each of the last two plates and each having a side wall having its bottom deflected downwardly and inwardly towards the outwardly deflected plate of the first mentioned collecting chamber adjacent thereto, and a diaphragm for each of the last two plates extending across the ribs thereof and across the deflected lower end of the wall of its collecting chamber.

2. In an electrolytic cell, the combination of a pair of anode plates arranged back to back and each having in its outer face a plurality of vertical V-shaped ribs, a collecting chamber above said plates, said chamber having the bottoms of its sides deflected downwardly and outwardly with the lower ends thereof in the planes of the ribs of said plates respectively, a diaphragm extending across the ribs of each of said plates and across the lower edges of the corresponding chamber walls, a cathode plate cooperating with each anode plate and each having ribs in a face thereof presented towards an anode plate, a collecting chamber for each cathode plate and each having a side wall having its bottom deflected downwardly and inwardly toward the outwardly deflected plate of the anode collecting chamber adjacent thereto, a diaphragm for each cathode plate extending across the ribs thereof and across the deflected lower end of the wall of its collecting chamber, a conductor rod interposed between the anode plates and electrially connected thereto, a supporting rod interposed between and connected to said anode plates, and a conducting rod and a supporting rod secured to each of said cathode plates.

3. In an electrolytic cell, the combination of a plate having V-shaped ribs projecting from one face thereof, a supporting frame for said plate, means for securing said plate to said frame with the ribs thereof in substantially the plane of one of the lateral edges of said frame, there being a collecting chamber provided within the upper portion of said frame, one of the walls of said chamber having its lower end deflected outwardly into the plane of said ribs, and a diaphragm secured to said frame and extending across said ribs and across the deflected end of the collecting chamber wall.

4. In an electrolytic cell, the combination of a central frame having an inwardly directed flange at the top and sides of each lateral edge thereof, walls secured to the flanges of each frame, within the upper portion thereof, each wall having its lower end deflected outwardly into the plane of the adjacent flange of its frame, a pair of electrode plates within the central frame, below the deflected lower ends of the walls thereof respectively and each having substantially V-shaped ribs in the plane of the lower end of its cooperating wall, a frame on each side of the central frame and each having a flange at the top and sides of the lateral edge which is adjacent the central frame, a wall secured to the flange of each of the last mentioned frames, the lower end of each such wall being deflected into the plane of its flange, an electrode plate in each of the last mentioned frames and having V-shaped ribs in the plane of such lower end of the wall thereabove and of the flange corresponding thereto, diaphragms extending across the ribs of said plates and across the lower ends of the walls corresponding thereto, channel shaped clamping and spacing members for securing said diaphragms to their respective frames, and means for securing the upper ends of said diaphragms above and in engagement with the deflected portions of their respective walls.

5. In an electrolytic cell, the combination of a pair of oppositely facing electrode plates each having projections on the outer face thereof, an electrode plate facing and spaced from each of the first mentioned plates and having projections presented toward the projections on such first mentioned plates, a collecting chamber above and common to the first mentioned plates and plates having the bottoms of its sides deflected outwardly above said plates, a collecting chamber above each of the other plates and each having its inner wall deflected inwardly above the inner surface of its plate, and diaphragms secured to the said frames and extending across and in contact with the projections of said plates and the lower ends of the walls of their respective collecting chambers.

6. In an electrolytic cell, the combination of a pair of oppositely facing anode plates each having projections on the outer face thereof, a cathode plate facing and spaced from each anode plate and having projections presented toward the projections on its cooperating anode plate, a collecting chamber above and common to the anode plates and having the bottoms of its sides deflected outwardly above said plates, a collecting chamber above each cathode plate and each having its inner wall deflected inwardly above the inner surface of its cathode plate, diaphragms secured to the frame for the anode plates and extending across and in contact with the projections on said plates and the lower ends of the walls of their collecting chamber, a diaphragm extending across the projections on each cathode plate and across the lower edge of the inwardly deflected wall of its collecting chamber, and means for spacing the anode plates and their diaphragms from the cathode plates and their diaphragms.

7. In an electrolytic cell, the combination of a collecting chamber having side walls the bottoms whereof are deflected outwardly and each provided with flange ends above its bottom, a strap secured to the flange ends of each wall above the deflected lower end thereof, a pair of plates below said walls, each plate having projections on the outer face thereof in substantially the plane of the lower end of the wall thereabove, and a diaphragm extending across the projections of each plate and across the deflected end of the chamber wall thereabove and secured to the strap above such deflected end.

8. In an electrolytic cell, the combination of a collecting chamber having a wall provided with a deflected lower end and with flanged ends above such lower end, a strap secured to the flanged ends of such wall above the lower deflected end thereof, a plate below said wall, said plate having projections on the outer face thereof in substantially the plane of the lower end of said wall, and a diaphragm extending across the projections of said plate and across deflected end of the chamber wall thereabove and secured to the strap above such deflected end.

9. In an electrolytic cell, the combination of a supporting frame having a channeled upper end and channeled sides extending downwardly from said upper end, a pair of plates each having outwardly extending flanges at its top and sides, each of said plates being secured to one of the top flanges and to the side flanges corresponding thereto of said frame and each plate having its lower end deflected outwardly into the plane of the side flanges corresponding thereto, a strap secured to the flanged ends of each of said plates above the deflected lower end thereof, a pair of plates below the outwardly deflected walls and each having projections in substantially the plane of such lower deflected end of its wall, a diaphragm secured to each strap and extending across the deflected end of the wall therebeneath and across the projections on the plate corresponding thereto, and a channel clamp applied to each side of said frame for securing the diaphragms thereto.

10. In an electrolytic cell, the combination of a plurality of open frames each having a collecting chamber in the upper portion thereof, an electrode plate suspended within each of said frames, said electrode plates each having projections in one face thereof in substantially the plane of the lower edge of one of the walls of its collecting chamber, a diaphragm extending across the projections on each electrode plate and across the wall of the collecting chamber corresponding thereto, and combined clamping and frame spacing means for securing said diaphragms to said frames.

11. In an electrolytic cell, the combination of a frame comprising an upper portion and side portions and having a collecting chamber in the upper portion thereof, the lower edge of each side wall of said chamber being in substantially the plane of a side of such frame, a pair of electrodes within said frame and below the said chamber, each electrode having projections in substantially the plane of a side of such frame, a diaphragm extending around the said frame in contact with the projections on said electrodes and with the lower edges of the side walls of said collecting chamber, and means cooperating with the opposite portions of said frame for securing said diaphragm thereto.

12. In an electrolytic cell, the combination of a frame comprising an upper portion and side portions and having a collecting chamber in the upper portion thereof, the lower edge of each side wall of said chamber being in substantially the plane of a side of such frame, a pair of electrodes within said frame and below the said chamber, each electrode having projections in substantially the plane of a side of such frame, and a diaphragm extending around the said frame in contact with the projections on said electrodes and with the lower edges of the side walls of said collecting chamber.

13. An electrolytic cell comprising, in combination, a casing, a centrally located frame within said casing and comprising an upper portion and side portions depending from such upper portion, a similar frame located on each side of the first mentioned frame, each of said frames having within the upper portion thereof a collecting chamber, each collecting chamber having a pair of side walls each having its lower edge in substantially the plane of a side of such frame, an electrode located within each side frame, an electrode located within each side of the central frame and each having outwardly extending projections in substantially the plane of the bottom of the chamber wall thereabove, an electrode within the inner side of each of the other frames and each having inwardly extending projections in substantially the plane of the bottom of the chamber wall thereabove, and a diaphragm extending about each of said frames and across the bottom edges of the chamber walls thereof.

14. An electrolytic cell comprising in combination, a casing, a centrally located frame within said casing and comprising an upper portion and side portion depending from such upper portion, a similar frame located on each side of the first mentioned frame, each of said frames having within the upper portion thereof a collecting chamber, each collecting chamber having a pair of side walls each having its lower edge in substantially the plane of a side of such frame, an electrode located within each side of the central frame and each having outwardly extending projections in substantially the plane of the bottom of the chamber wall thereabove, an electrode within the inner side of each of the other frames and each having inwardly extending projections in substantially the plane of the bottom of the chamber wall thereabove, a diaphragm extending about each of said frames and across the bottom edges of the chamber walls thereof, and a channel-shaped clamping member applied to opposite sides of each frame and securing its diaphragm thereto.

15. In an electrolytic cell, the combination of an open frame having a collecting chamber in the upper portion thereof, the bottom edge of each side wall of said chamber being in substantially the plane of the side of said frame corresponding thereto, an electrode suspended within said frame below one of said walls and having projections in one face thereof in substantially the plane of the lower edge of such wall, and a diaphragm secured to said frame and extending across the projections on the electrode and across the lower edge of the wall of the collecting chamber thereabove.

16. In an electrolytic cell, the combination of a plurality of open frames, each having a collecting chamber in the upper portion thereof provided with a wall having its lower edge in substantially the plane of one side of such frame, an electrode plate suspended within each of said frames, each plate having projections in one face thereof below and in substantially the plane of the bottom edge of the chamber wall for such frame, a diaphragm extending around each frame and across the bottom edge of the wall of the collecting chamber carried by such frame and in contact with the projections of the electrode plate for such frame, and channel-shaped clamping members applied to opposite sides of each frame and securing its diaphragm thereto and serving to space the said frames and the diaphragm thereof.

In testimony whereof, I hereunto affix my signature.

JOHN HARRIS.